United States Patent
Pathak et al.

(10) Patent No.: US 10,333,707 B1
(45) Date of Patent: Jun. 25, 2019

(54) SYSTEMS AND METHODS FOR USER AUTHENTICATION

(71) Applicant: FMR LLC, Boston, MA (US)

(72) Inventors: Kshitij Pathak, Karnataka (IN); Sethu Subramanian Chettiar, Tamil Nadu (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/987,368

(22) Filed: May 23, 2018

(51) Int. Cl.
*H04L 29/06* (2006.01)
*H04L 9/08* (2006.01)

(52) U.S. Cl.
CPC .......... *H04L 9/0866* (2013.01); *H04L 63/061* (2013.01)

(58) Field of Classification Search
CPC ........................... H04L 9/0866; H04L 63/061
See application file for complete search history.

(56) References Cited

U.S. PATENT DOCUMENTS

| | | | | |
|---|---|---|---|---|
| 7,512,799 | B1 * | 3/2009 | Chow | H04L 63/0815 713/172 |
| 8,799,666 | B2 | 8/2014 | Kesanupalli et al. | |
| 2003/0181199 | A1 * | 9/2003 | Yamaguchi | H04L 29/06 455/414.1 |
| 2004/0236632 | A1 * | 11/2004 | Maritzen | G06Q 20/02 705/26.1 |
| 2006/0012626 | A1 * | 1/2006 | Nlend | B41J 2/17546 347/19 |
| 2007/0140145 | A1 * | 6/2007 | Kumar | G06F 21/32 370/254 |
| 2009/0307139 | A1 | 12/2009 | Mardikar et al. | |
| 2010/0323714 | A1 * | 12/2010 | Schmidt | H04W 48/18 455/456.1 |
| 2011/0082802 | A1 | 4/2011 | Baghdasaryan et al. | |
| 2013/0227291 | A1 * | 8/2013 | Ahmed | H04L 63/0281 713/171 |
| 2013/0262687 | A1 * | 10/2013 | Avery | G06F 9/54 709/229 |
| 2014/0244429 | A1 * | 8/2014 | Clayton | G06Q 30/0631 705/26.7 |

(Continued)

OTHER PUBLICATIONS https://source.android.com/security/authentication/fingerprint-hal.html, 5 pages.

*Primary Examiner* — Mahfuzur Rahman
(74) *Attorney, Agent, or Firm* — Proskauer Rose LLP

(57) ABSTRACT

Systems and methods for authenticating an electronic transaction are described. A request to complete an electronic transaction is initiated using a third party application installed on a computing device. The third party application receives, from a remote server, a temporary URL including a token. A background application installed on the computing device decrypts the token. The computing device displays details of the request provided by a user of the computing device and prompts the user to provide biometric information to verify the request. A biometric hardware device in communication with the computing device receives biometric information and passes it to a hardware abstraction layer of the computing device, which maps the biometric information to generate a key. The background application encrypts the key and sends the encrypted key to the remote server. The computing device receives a verification result for the request, e.g., via the third party application.

22 Claims, 6 Drawing Sheets

(56) References Cited

U.S. PATENT DOCUMENTS

| | | | |
|---|---|---|---|
| 2014/0244447 A1* | 8/2014 | Kim | G06Q 30/0254 |
| | | | 705/27.2 |
| 2014/0244488 A1* | 8/2014 | Kim | G06Q 20/02 |
| | | | 705/39 |
| 2016/0098701 A1 | 4/2016 | Harris | |
| 2016/0134932 A1* | 5/2016 | Karp | H04W 4/80 |
| | | | 348/155 |

* cited by examiner

SYSTEMS AND METHODS FOR USER AUTHENTICATION

TECHNICAL FIELD

This application relates generally to systems, methods and apparatuses, including computer programs, for user authentication. More specifically, this application relates to biometric authentication of a user transaction requested within a third party application.

BACKGROUND

Computing devices such as mobile phones and tablets are offering a growing number and diversity of computing applications. In 2017, the Apple App store alone had over two million "apps" available for download across a wide variety of industries. However, the sheer number of options can prove overwhelming for some users, and many users actually prefer to use only a few applications rather than switch between applications for various purposes.

Certain service providers that offer applications handling sensitive data (e.g., financial service providers) require a heightened level of security before permitting a user to access such data (e.g., to check the status of a financial portfolio) or interact with the service provider (e.g., to place a stock order). As a result, many such service providers have not integrated their platforms with other applications, accepting some inconvenience to the user (e.g., operating within a separate app with a separate password to remember) as a necessary cost of data security.

Other approaches to heightened security also suffer from significant drawbacks, particularly in the context of mobile phones or tablets. For example, one common approach is to use a one time password (OTP) as a second level of authentication. Under this approach, an application generates an OTP (e.g., a sequence of numbers) on its server and sends the OTP to the user's computing device (e.g., via a message, email or display screen). Then, the user keys the OTP into the third party application, which sends the OTP back to the target application to verify that the user-entered credentials match the generated OTP. One challenge with this approach is that if an unwanted party has gained access to the user's device, the OTP is then sent to the same compromised device, rendering the OTP ineffective as a second line of defense.

SUMMARY

The invention includes systems and methods for providing new channels to access functionalities of a service provider (e.g., for a financial services provider, entry of a stock order or checking the status of a portfolio) securely without the need to switch applications. The user can interact with the service provider via a third party application (e.g., a social media application such as Twitter or Facebook), but is prompted to provide biometric information (e.g., a fingerprint scanned by a mobile phone) to provide an additional layer of authentication before accessing sensitive information. This setup allows the user not to have to use multiple applications (and remember multiple passwords), while enabling service providers to verify the identity of the end user to an acceptable degree of security.

For example, a user may open the Twitter app on a mobile phone and place a tweet to Fidelity's Twitter handle requesting to make a stock trade. Fidelity can "sweep" Twitter for such tweets in the background, and in response to receiving the tweet, generate a temporary or short-lived URL containing a randomly generated token. Fidelity sends the temporary URL including the token back to the user via Twitter. When the user clicks the temporary URL, the user receives a prompt to provide fingerprint authentication via the user's mobile hardware fingerprint scanner. Authentication information is sent back to Fidelity, which then uses that information to confirm that the correct user has placed the order. If the user is authenticated, the stock trade is placed. Following this approach, even if the Twitter account were compromised, a second layer of protection exists to verify the user.

To enable this method, the user can have a background application installed on the mobile device, which scans in the background for URLs of the appropriate format. When a suitable URL is detected, the background application launches into foreground mode, displaying a user interface on the user's phone requesting the user to provide biometric data together with a countdown timer. The background application also encrypts the output of the firmware for the mobile hardware fingerprint scanner before sending it outside the computing device.

Each temporary URL is unique and is logged on the service provider's end, so it cannot be reused after it expires (e.g., after a period of one second to fifteen minutes, or in some cases thirty minutes). Once the user is presented with a temporary URL, after a certain time it is flagged as expired and the user would need to request a new URL to complete the same transaction outside the relevant timeframe. The service provider does not need to store the fingerprint information; only the encryption and decryption algorithms that mask the fingerprint authenticator information need to be stored. This way, even if a hacker obtains physical access to the device, the thumbprint information that is registered against the service provider's encryption keys will need to be used; failing to do so will lead to transaction failure.

In one aspect, the invention features a computerized method of authenticating an electronic transaction using a computing device. The method includes initiating, using a third party application (e.g., a social media application) installed on the computing device, a request to complete the electronic transaction, the request including one or more request details provided by a user of the computing device. The method also includes receiving, by the third party application, from a remote server via a communications network in communication with the computing device, a temporary URL including a token. The method also includes decrypting, by a background application installed on the computing device, the token included in the temporary URL. The method also includes displaying, on the computing device, a prompt for the user of the computing device to provide biometric information to verify the request. The method also includes receiving, by a biometric hardware device in communication with the computing device, biometric information. The method also includes passing, by the biometric hardware device, the biometric information to a hardware abstraction layer of the computing device, the hardware abstraction layer mapping the biometric information to generate a key. The method also includes encrypting, by the background application, the key, thereby creating an encrypted key. The method also includes sending, by the background application, the encrypted key to the remote server via the communications network. The method also includes receiving, by the computing device, from the remote server via the communications network, a verification result for the request.

In some embodiments, the computing device is a mobile computing device. In some embodiments, the request includes information comprising a security name and a quantity (e.g., to buy 100 shares of IBM as a market order, the user may enter "#buy #100 #ibm #market" or "buy 100 shares of IBM at market price"). In some embodiments, generating the key includes generating an asymmetric key pair. In some embodiments, the computing device enrolls the public key on the server and sends the encrypted key, which includes a signed piece of data. In some embodiments, receiving the biometric information further includes interacting with a hardware abstraction layer of the computing device. In some embodiments, the hardware abstraction layer generates a key corresponding to the biometric information. In some embodiments, the key is stored in a trusted execution environment. In some embodiments, the electronic transaction is placed using an account that the user has registered with an administrator of the third party application.

In some embodiments, the electronic transaction is a financial trade, a financial portfolio status inquiry, a healthcare payment, or a confidential record. In some embodiments, the biometric information encodes one of fingerprint information, iris scan information, facial recognition information, or voice recognition information associated with the user. In some embodiments, the remote server stores encryption and decryption algorithms configured to mask and unmask the fingerprint information. In some embodiments, the temporary URL lasts for between one second and fifteen minutes before expiring. In some embodiments, the temporary URL is based on a first section including a standard baseline URL format and a second encrypted section specific to the order. For example, taking the example of buying 100 shares of IBM, the order information is first encrypted using the asymmetric key that was generated in registration to generate an alphanumeric value ("encryptedRequestInfo") and is then appended to a particular format url, e.g., "fidelity.twiter.order.com". In this case, the url would be: fidelity.twiter.order.com/encryptedRequestInfo, which will be decoded by the background app and in turn be used for verification and execution of the order. In some embodiments, the temporary URL is generated randomly by the remote server. In some embodiments, the biometric information is captured by hardware included in the computing device. In some embodiments, the remote server includes a biometric reference of the user, the biometric reference enabling determination of the verification result of the biometric information.

In another aspect, the invention features a system for authenticating an electronic transaction. The system includes a remote server configured to verify biometric information and generate a verification result for the biometric information. The system also includes a communications network in communication with the remote server. The system also includes a computing device in communication with the communications network. The computing device is configured to initiate, using a third party application installed on the computing device, a request to complete the electronic transaction, the request including one or more request details provided by a user of the computing device. The computing device is configured to receive, by the third party application, from the remote server via the communications network, a temporary URL, thereby launching a background application installed on the computing device. The computing device is configured to display, upon accessing the temporary URL including a token. The computing device is configured to decrypt, by a background application installed on the computing device, the token included in the temporary URL. The computing device is configured to display a prompt for the user of the computing device to provide biometric information to verify the request. The computing device is configured receive, by a biometric hardware device in communication with the computing device, the biometric information. The computing device is configured to pass, by the biometric hardware device, the biometric information to a hardware abstraction layer of the computing device, the hardware abstraction layer mapping the biometric information to generate a key. The computing device is configured to encrypt, by the biometric hardware device, the key, thereby creating an encrypted key. The computing device is configured to send, by the background application installed on the computing device, the encrypted key to the remote server via the communications network. The computing device is configured to receive, from the remote server via the communications network, the verification result for the request.

In some embodiments, the remote server is configured to compare the information included in the encrypted key with a biometric reference stored on the remote server to generate the verification result for the biometric information. In some embodiments, the background application is configured to activate a biometric sensor of the biometric hardware device and to encrypt the output of firmware for the biometric sensor. In some embodiments, the remote server stores an encryption algorithm configured to mask the biometric information and a decryption algorithm configured to unmask the biometric information. In some embodiments, the electronic transaction is a financial trade or a financial portfolio status inquiry.

In another aspect, the invention features a computerized method of authenticating an electronic transaction using a remote server. The method includes receiving, by a server application installed on the remote server, a request to complete an electronic transaction via a third party account. The method also includes identifying, by the server application installed on the remove server, a user account corresponding to the third party account. The method also includes requesting, by the server application installed on the remote server, to generate a temporary URL based on information associated with the request. The method also includes sending, by the server application installed on the remote server, the temporary URL to a computing device via a communications network in communication with the remote server. The method also includes receiving, by the server application installed on the remote server, an encrypted key reflecting biometric information of the user and generated by the computing device. The method also includes decrypting, by the server application installed on the remote server, the encrypted key, thereby recovering unencrypted biometric information. The method also includes checking, by the server application installed on the remote server, against a biometric reference stored on the remote server, whether the unencrypted biometric information is sufficient to validate the request. If the server application validates the request, the method includes processing the request and sending a positive verification result, by the remote server, via the communications network, to the computing device. If the server application does not validate the request, the method includes sending a negative verification result, by the remote server, via the communications network, to the computing device.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead placed generally upon illustrating the principles of the invention.

DETAILED DESCRIPTION

Figure 1:
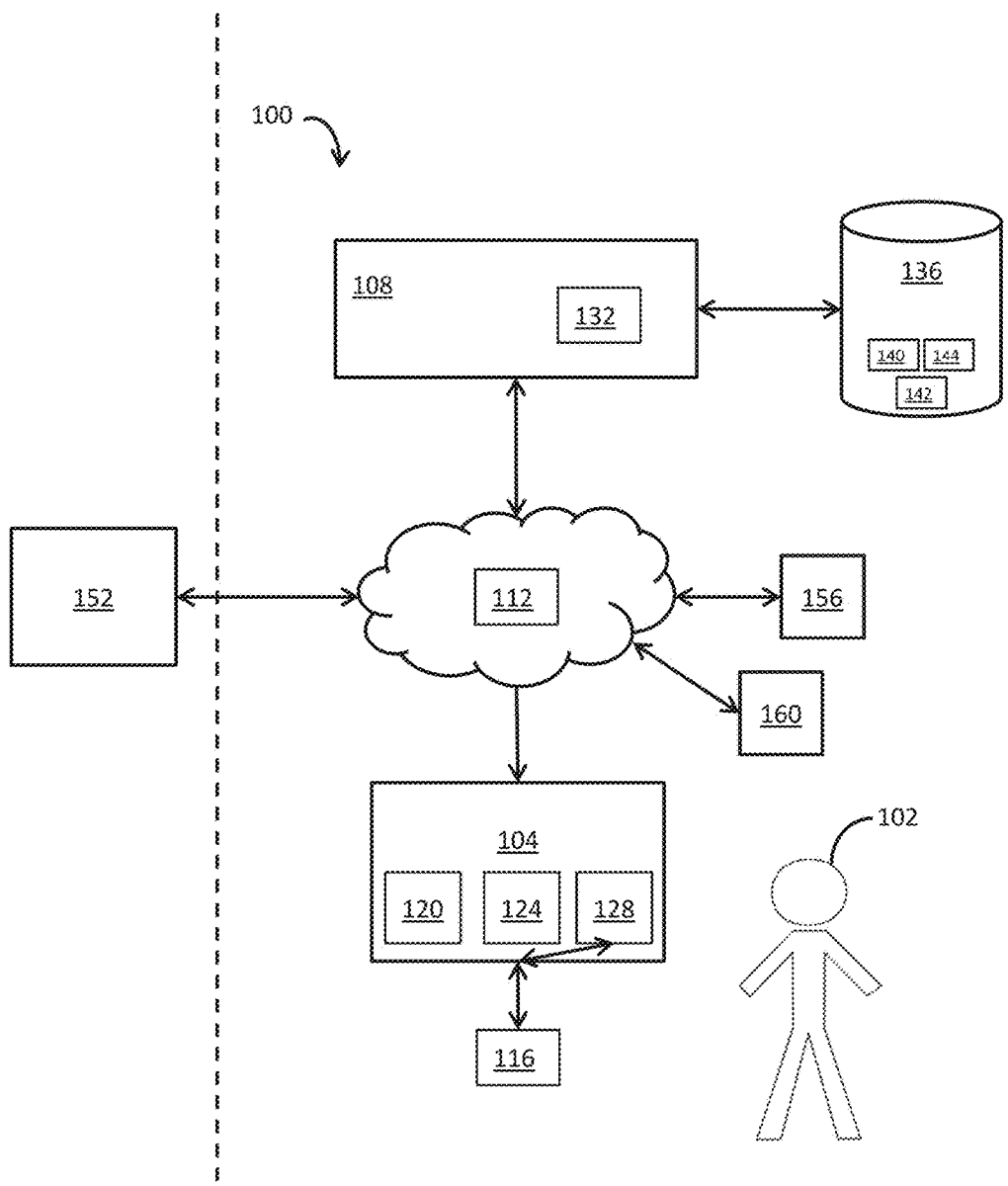
FIG. 1 is a schematic diagram of a system for authenticating an electronic transaction using biometric information of a user, according to an illustrative embodiment of the invention.

FIG. 1 is a schematic diagram of a system 100 for authenticating an electronic transaction using biometric information of a user 102, according to an illustrative embodiment of the invention. The system 100 includes a computing device 104, a remote server 108 in communication with the computing device 104 via a communications network 112, and a biometric hardware device 116 in communication with (e.g., included within and electronically hard wired to) the computing device 104. The computing device 104 includes an installed social media application 120, a background application 124 and a hardware abstraction layer 128. The remote server 108 includes a server application 132 and is in communication with a database 136 (e.g., for storing details of a user account 140, one or more records of transaction requests 142, and one or more records of verification results 144 for transactions requests 142). The system 100 interacts with an external server 152, for example a social media application server.

In some embodiments, the computing device 104 is a mobile device, such as a mobile phone or a tablet. In some embodiments, the biometric hardware device 116 is a fingerprint sensor that is hard wired into the computing device 104. In some embodiments, the system includes a second server 156 in communication with the communications network 112 (e.g., to perform specific functions such as generating temporary URLs, as described in greater detail below). In some embodiments, the system includes a third server 160 in communication with the communications network 112 (e.g., to perform specific functions such as receiving encrypted keys, as described in greater detail below). In some embodiments, the computing device 104 is included in a front-end system and the server 108 and database 136 are included a back-end system (optionally with the second server 156 and the third server 160).

Figure 2:
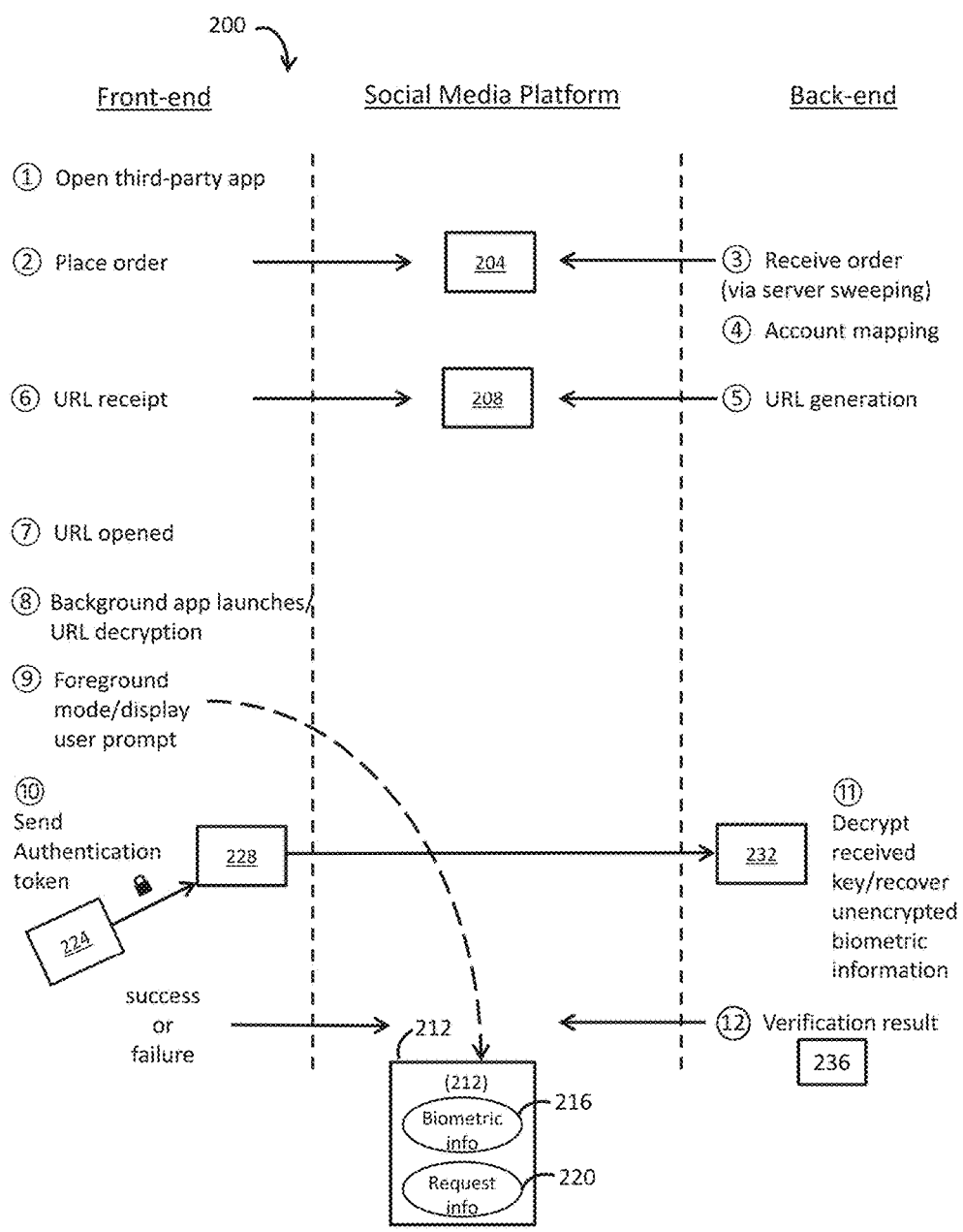
FIG. 2 is a flow diagram of a method for authenticating an electronic transaction using biometric information of a user, according to an illustrative embodiment of the invention.

FIG. 2 is a flow diagram 200 of a method for authenticating an electronic transaction using biometric information of a user, according to an illustrative embodiment of the invention. The method 200 can be implemented on the system shown and described in FIG. 1. In one example, prior to commencing the method 200, the user has established accounts with a service provider (e.g., a Fidelity account) and a third party service (e.g., a Twitter account). The user also has a third party service ID registered with the service provider, which is part of the third party account profile and permits the service provider to map the third party account to the main account. The user also has completed a biometric (e.g., fingerprint) registration with the service provider. In some embodiments, the service provider's server (e.g., the remote server 108 shown and described in FIG. 1) does not store the biometric information itself, but instead stores a key that is generated by a hardware abstraction layer of the user device (e.g., the computing device 104 shown and described in FIG. 1) that is based on biometric information of the user.

According to the method 200, in a first step (1), the user opens, on a computing device, an installed third party application offered by the third party service (e.g., the Twitter app). In a second step (2), using the third party application, the user initiates a request 204 to complete an electronic transaction (e.g., to place a stock order to Fidelity), the request including one or more request details provided by the user of the computing device. The request 204 can be via a direct message, such as to Fidelity's Twitter handle, over a communications network in communication with the computing device. Meanwhile, in the background, a remote server (e.g., the remote server 108 shown and described in FIG. 1) runs a social media sweeper, built into a remote server application installed on the remote server, to monitor direct messages. If a message is present, in a third step (3), the server receives, via the server application, the request 204 to complete the electronic transaction (e.g., via the social media account).

In a fourth step (4), on receiving the message containing the request 204, the server application identifies a user account corresponding to (e.g., mapped to) the social media account. In some embodiments, the remote server application records the transaction request in a database (e.g., the database 136 shown and described above in FIG. 1) of the remote server. In some embodiments, if it is determined that there is no user account on file, the remote server generates a reply containing an error message and helpful details (e.g., "Invalid request. Please contact Fidelity Investments at 1-800-NUMBER to enroll in the social media program."), which can be sent to the user via social media.

In a fifth step (5), the server application requests for a temporary URL 208 (e.g., a short-lived URL lasting between one second and fifteen minutes, or up to thirty minutes) to be generated based on information associated with the request (e.g., the current time and/or device ID). The temporary URL 208 can be generated by the server application or by another program running on a different server (e.g., the server 156 shown and described above in FIG. 1) and sent to the user device via the social media server. The temporary URL 208 can be in a URL style format, even though it is not a true URL in the sense that it does not point to any resource on the internet (e.g., "fidelity.twitter.order.com/encryptedRequestInfo," where the "encryptedRequestInfo" portion is based on a known encryption algorithm, for example, the RSA encryption algorithm). The key used for encryption can be a shared secret, with the asymmetric key set up when the user completes initial enrollment. In a sixth step (6), the computing device receives the temporary URL 208 via the communications network (e.g., via the user's chat interaction with Fidelity).

In a seventh step (7), having received the temporary URL 208, the computing device's default browser launches. Meanwhile, the previously installed background application associated with the service provider (e.g., Fidelity's background app) is monitoring for URLs matching the temporary URL format. If a temporary URL 208 matches the format, in an eighth step (8), the background application decrypts the information contained in the temporary URL 208 (e.g., using a shared secret) and launches into foreground mode. In a ninth step (9), while the background app is in foreground mode, the computing device displays a prompt 212 for the user to provide biometric information 216 to verify the user's request. In some embodiments, the prompt 212 also displays the user's request 220 to confirm the requested action.

In a tenth step (10), the user provides his or her biometric information, which is received by (e.g., via a fingerprint scanner) a biometric hardware device (e.g., the biometric hardware device 116 shown and described in FIG. 1) in communication with the computing device. Meanwhile, the biometric hardware device passes the biometric information 216 to a hardware abstraction layer of the computing device, the hardware abstraction layer mapping the biometric information to generate a key 224 reflecting biometric information of the user. The computing device then encrypts the key, thereby generating an encrypted key 228. The computing device then sends, using the background application, the encrypted key 228 to the remote server via the communications network. In some embodiments, the encrypted key 228 is sent to a separate remote server (e.g., the server 160 shown and described in FIG. 1). In other words, if validated, the app encrypts the key (e.g., token) generated after successful biometric validation and the request detail and sends the encrypted key to the destination URL (e.g., a server, rather than an internet resource).

In an eleventh step (11), the remote server (or alternate server) receives the encrypted key 228 and decrypts the encrypted key, thereby recovering unencrypted biometric information 232. In a twelfth step (12), the server checks, against a biometric reference stored on the remote server (e.g., included in the details of the user account 140 shown and described in FIG. 1), whether the unencrypted biometric information is sufficient to validate the request (e.g., it determines whether the request was made by a user with proper biometric information and was made within the time duration allowed), and the server application generates a verification result 236 for the request, which is sent to, and received by, the computing device. If the server application validates the request, it processes the request and sends a positive verification result to the computing device via the communications network (e.g., via the social media application). If the server application does not validate the request, it sends a negative verification result to the computing device via the communications network (e.g., via the social media application). On the computing device, for a successful request, the user is given an indication that the order has been placed. If the request fails, the user is given server informs the user that the transaction has failed (e.g., via Twitter or Facebook).

The above method 200 thus incorporates a heightened layer of security to authenticate a user before permitting the user to access and interact with sensitive account information. For example, the service provider cannot reveal customer data simply because certain messages are coming from a particular social media ID mapped to a certain customer account, because if the social media account were compromised, then the service provider would inadvertently reveal customer information to a fraudster. To manage this risk, the present invention includes an additional layer of security that requires the user to be present and input biometric information into the computing device before the transaction is allowed to proceed. Another advantage is that if the third party system (server) were to be compromised and passing spurious transaction request details, the system would still be mirroring back the request the user keyed in via the social media app on the background app before capturing the user's biometric, thereby allowing the user to be aware what transaction is being placed.

The present invention provides a particularly improved solution over the typical second line of defense, OTP, with respect to mobile devices. OTPs are typically sent to whatever account the user has registered with the service provider (e.g., an email account or a mobile number). In the case of mobile devices, there is a greater chance for the second line of defense to fail when the first one fails. For example, if the OTP is sent to the mobile number or if the user has set up his or her mobile to receive emails, that information would also be seen by the unauthorized party. The problem can be particularly bad with the advent of "sniffer apps," which sit dormant on mobile phones and wait for messages that hold OTP numbers. These days, almost every app installed on a mobile phone seeks permission to access messages and emails, opening a gateway for session hijacking using already compromised credit card information.

Figure 3A:
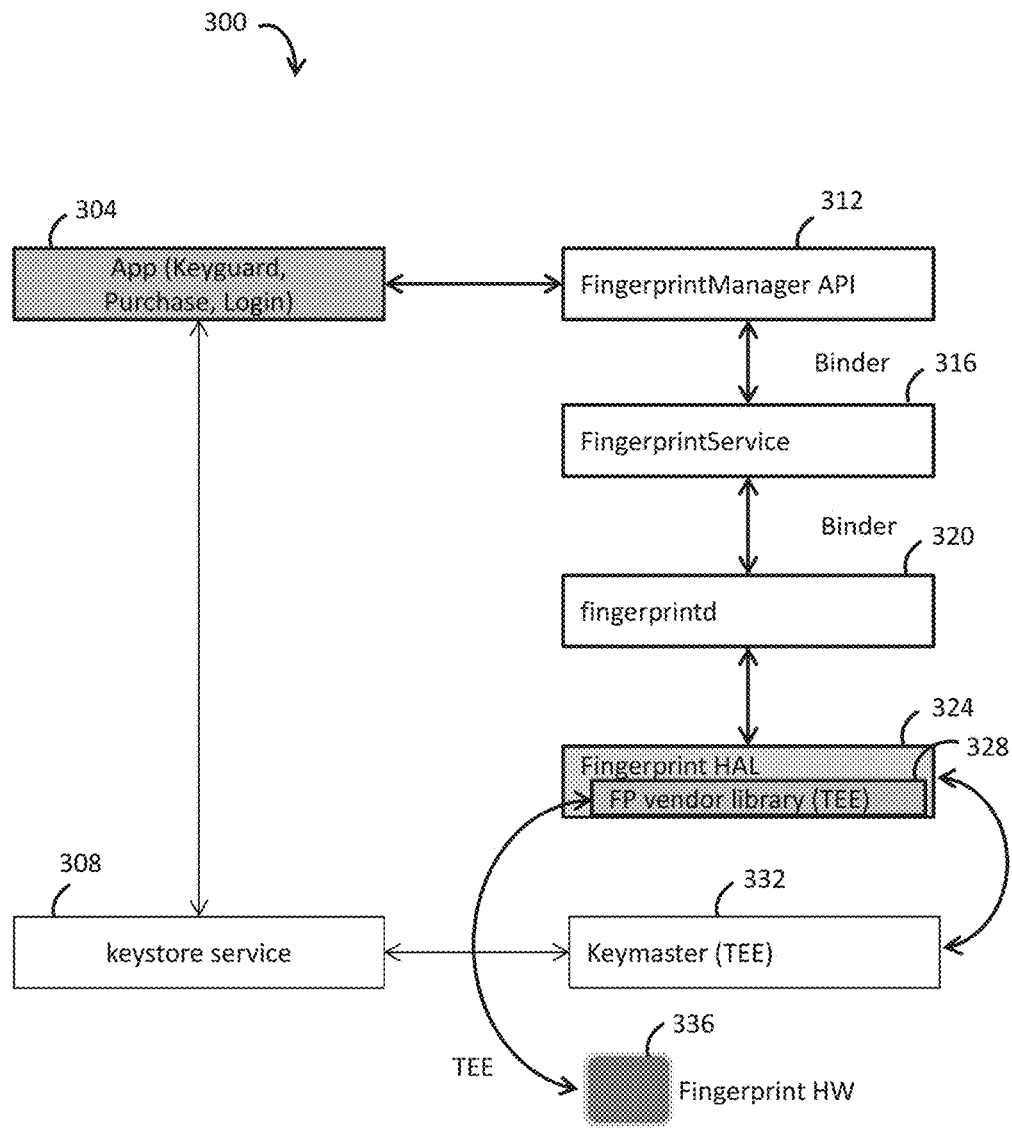
FIG. 3A is a data flow diagram showing a scheme for authenticating biometric information using a computing device, according to an illustrative embodiment of the invention.
Figure 3B:
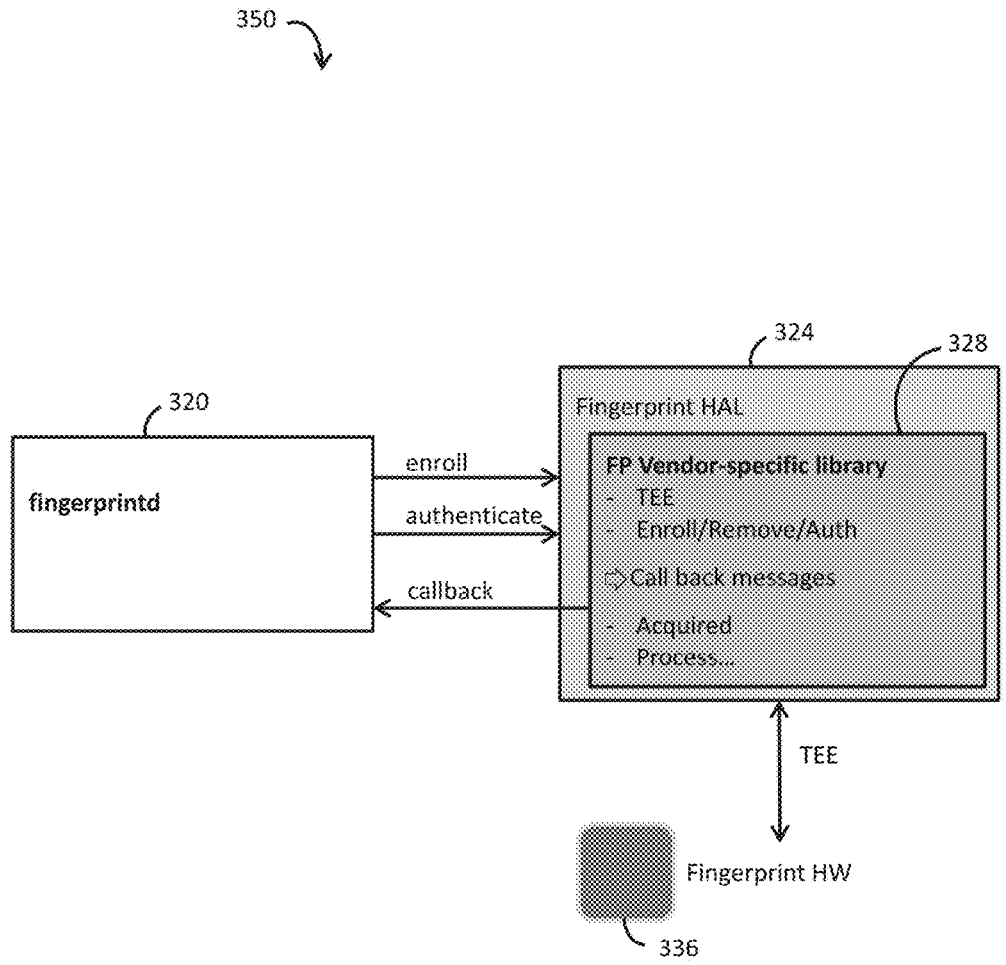
FIG. 3B is a data flow diagram showing interaction between a fingerprint daemon and a fingerprint vendor-specific library, according to an illustrative embodiment of the invention.

FIG. 3A is a data flow diagram 300 showing a scheme for authenticating biometric information using a computing device (e.g., the computing device 104 shown and described above in FIG. 1), according to an illustrative embodiment of the invention. The data flow diagram 300 shows known methods put forth by Android for managing data flow between a mobile app 304, a keystore service 308, a FingerprintManager application programming interface (API) 312, a FingerprintService 316, a fingerprint daemon (fingerprintd) 320, a fingerprint hardware abstraction layer (HAL) 324 including an FP vendor library 328, a Keymaster 332, and Fingerprint Hardware 336. FIG. 3B is a data flow diagram showing interaction between several elements of FIG. 3A in more detail. The discussion of FIGS. 3A and 3B reflects one Android implementation of the present invention, for which Android has laid out the specifications for vendors to manufacture the underlying hardware, but one of ordinary skill in the art will readily recognize that other implementations are possible.

In some embodiments, the Fingerprint Hardware Abstraction Layer (HAL) 324 performs the following functions specified by Android. (1) "enroll"—this function switches the HAL state machine to start the collection and storage of a fingerprint template. When enrollment is complete, or after a timeout, the HAL state machine is returned to the idle state. (2) "pre_enroll"—this function generates a unique token to indicate the start of a fingerprint enrollment and provides a token to the "enroll" function to ensure there was prior authentication, e.g., using a password. To prevent tampering, the token is wrapped (e.g., HMAC'd) after the device credential is confirmed. The token must be checked during enrollment to verify that the token is still valid. (3) "get_authenticator_id"—this function returns a token associated with the current fingerprint set. (4) "cancel"—this function cancels any pending enroll or authenticate operations, and the HAL state machine is returned to the idle state. (5) "enumerate"—this function provides a synchronous call for enumerating all known fingerprint templates. (6) "remove"—this function deletes a fingerprint template. (7)

"set active group"—this function restricts a HAL operation to a set of fingerprints that belong to a specified group (identified by a group identifier, or GID). (8) "authenticate"—this function authenticates a fingerprint-related operation (identified by an operation ID). (9) "set_notify"—this function registers a user function that will get notifications from the HAL. If the HAL state machine is in a busy state, the function is blocked until the HAL leaves the busy state.

The Fingerprint HAL can interact with the following components: (1) Fingerprint Manager API. The API interacts directly with an app in an app process. Each app has an instance of FingerprintManager, a wrapper that communicates with Fingerprint Service. (2) Fingerprint Service. This is a singleton service that operates in the system process, which handles communication with Fingerprint ID. (3) Fingerprintd (Fingerprint daemon). This is a C/C++ implementation of the binder interface from FingerprintService. The Fingerprintd operates in its own process and wraps the Fingerprint HAL vendor-specific library. (4) Fingerprint HAL vendor-specific library. A hardware vendor's implementation of the Fingerprint HAL. The vendor-specific library communicates with the device-specific hardware. (5) Keystore API and Keymaster. These components provide hardware-backed cryptography for secure key storage in a Trusted Execution Environment (TEE). These are the functions that are used to interact with the hardware, and are specified by Android. Access to the HAL in the current invention occurs through the FingerprintManager API, which is invoked when the user completes initial registration and the asymmetric keys are generated. Subsequently, the FingerprintManager API is used to "wake up" the hardware, to capture the user's biometric for authorizing the transaction and on success receiving the HAL's biometric output.

Figure 4:
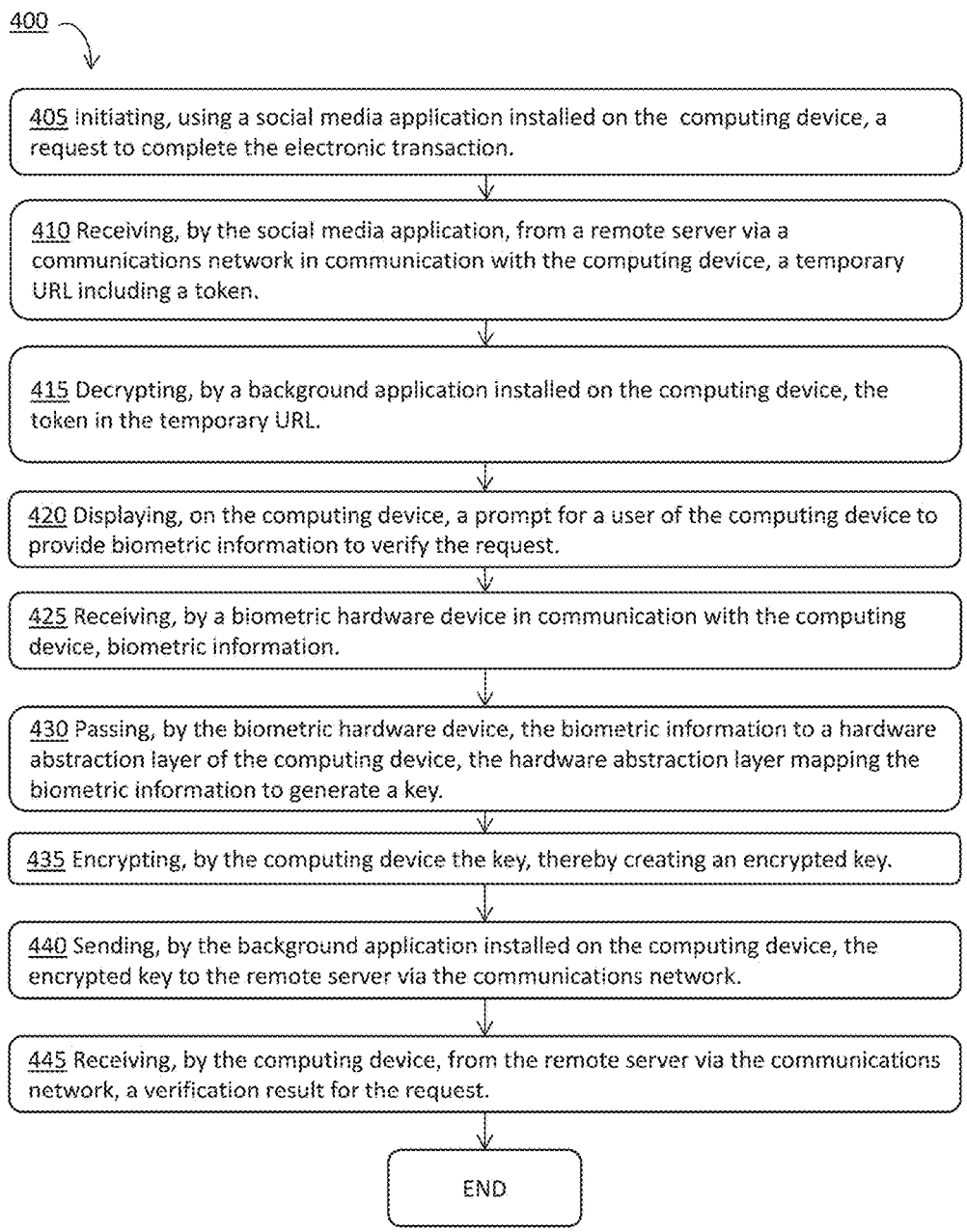
FIG. 4 is a flow diagram of a computerized method of authenticating an electronic transaction using a computing device, according to an illustrative embodiment of the invention.

FIG. 4 is a flow diagram of a computerized method of authenticating an electronic transaction using a computing device, according to an illustrative embodiment of the invention. In a first step 405, using a third party application (e.g., a social media application) installed on the computing device, a request to complete an electronic transaction is initiated. In a second step 410, the social media application receives, from a remote server via a communications network in communication with the computing device, a temporary URL including a token. In a third step 415, the background application installed on the computing device decrypts the token included in the temporary URL. In a fourth step 420, the computing device displays a prompt for a user of the computing device to provide biometric information to verify the request. In a fifth step 425, the biometric hardware device in communication with the computing device, receives the biometric information. In a sixth step 430, the biometric hardware device passes the biometric information to a hardware abstraction layer of the computing device, the hardware abstraction layer mapping the biometric information to generate a key. In a seventh step 435, the computing device encrypts the key, thereby creating an encrypted key. In an eighth step 440, the background application installed on the computing device sends the encrypted key to the remote server via the communications network. In an ninth step 445, the computing device receives, from the remote server via the communications network, a verification result for the request.

Figure 5:
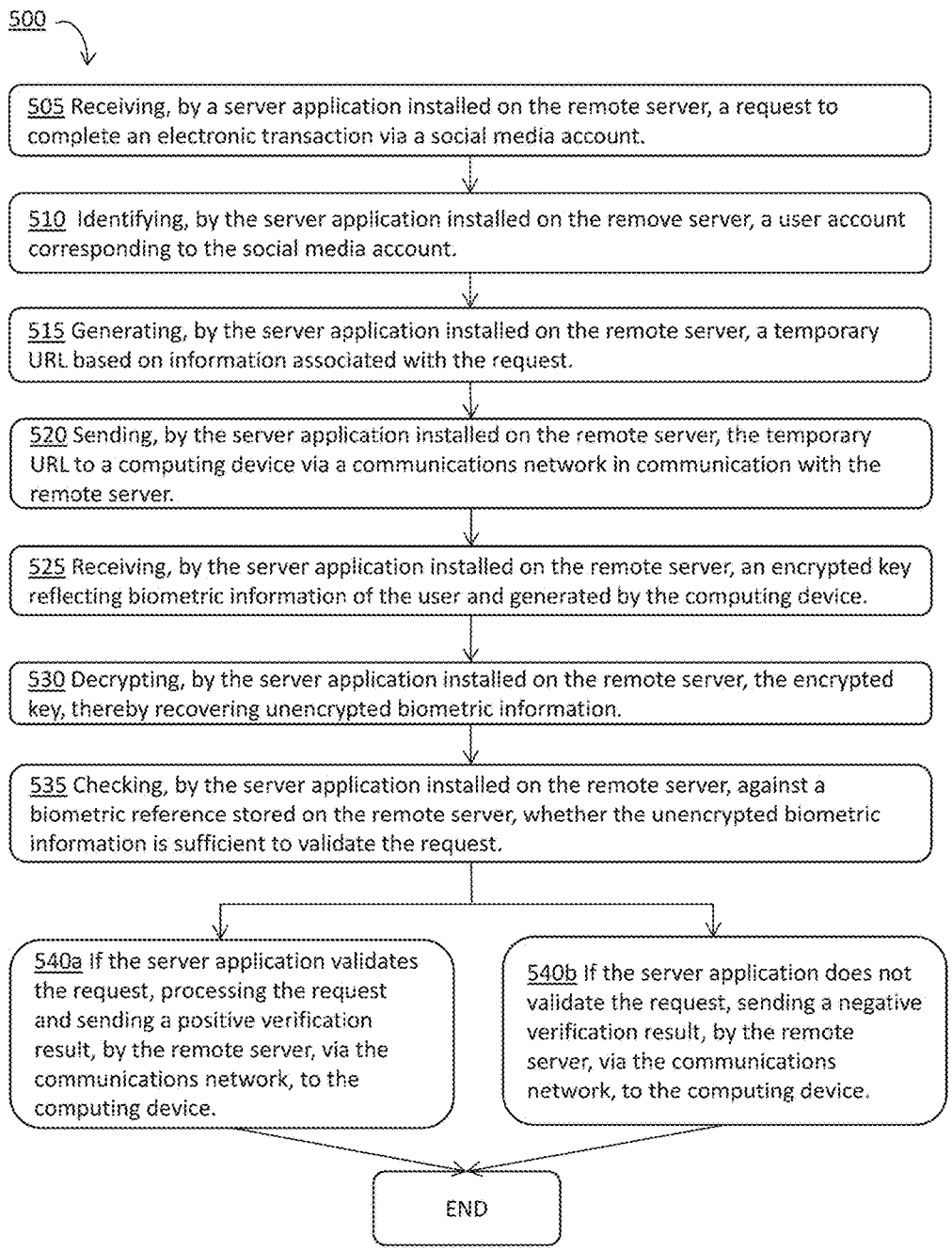
FIG. 5 is a flow diagram of a computerized method of authenticating an electronic transaction using a remote server, according to an illustrative embodiment of the invention.

FIG. 5 is a flow diagram of a computerized method of authenticating an electronic transaction using a remote server, according to an illustrative embodiment of the invention. In a first step 505, a server application installed on the remote server receives a request to complete an electronic transaction via a social media account. In a second step 510, the server application identifies a user account corresponding to the social media account. In a third step 515, the server application generates a temporary URL based on information associated with the request. In a fourth step 520, the server application sends the temporary URL to a computing device via a communications network in communication with the remote server. In a fifth step 525, the server application receives an encrypted key generated by the computing device, the encrypted key reflecting biometric information of the user. In a sixth step 530, the server application decrypts the encrypted key, thereby recovering unencrypted biometric information. In a seventh step 535, the server application checks, against a biometric reference stored on the remote server, whether the unencrypted biometric information is sufficient to validate the request (with order details decrypted to proceed with finalizing the transaction). In an eighth step 540, the server generates a verification result as follows: (i) if the server application validates the request, processing the request and sending a positive verification result, by the remote server, via the communications network, to the computing device (step 540*a*); or (ii) if the server application does not validate the request, sending a negative verification result, by the remote server, via the communications network, to the computing device (step 540*b*).

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of authenticating an electronic transaction using a computing device, the method comprising:
   initiating, using an untrusted third party application installed on the computing device, a request to complete the electronic transaction, the request including one or more request details provided by a user of the computing device to an untrusted third party application server operating independently of the computing device;
   receiving, by the third party application, from a remote server via the untrusted third party application server over a communications network in communication with the computing device, a temporary URL including an encrypted token reflecting the request details;
   decrypting, by a background application installed on the computing device, the encrypted token included in the temporary URL;
   displaying, on the computing device, the one or more request details and a prompt for the user of the computing device to provide biometric information to verify the request;
   receiving, by a biometric hardware device in communication with the computing device, biometric information;
   passing, by the biometric hardware device, the biometric information to a hardware abstraction layer of the computing device, the hardware abstraction layer mapping the biometric information to generate a key;
   encrypting, by the background application, the key, thereby creating an encrypted key;

sending, by the background application, the encrypted key to the remote server via the communications network; and receiving, by the computing device, from the remote server via the communications network, a verification result for the request based on the encrypted key sent to the remote server.

2. The method of claim 1 wherein the computing device is a mobile computing device.

3. The method of claim 1 wherein the request includes information comprising a security name and a quantity.

4. The method of claim 1 wherein generating the key includes generating an asymmetric key pair, and wherein the computing device enrolls the public key on the server and sends the encrypted key, the encrypted key including a signed piece of data.

5. The method of claim 1 wherein receiving the biometric information further includes interacting with a hardware abstraction layer of the computing device.

6. The method of claim 2 wherein the hardware abstraction layer generates a key corresponding to the biometric information.

7. The method of claim 6 wherein the key is stored in a trusted execution environment.

8. The method of claim 1 wherein the electronic transaction is placed using an account that the user has registered with an administrator of the third party application.

9. The method of claim 1 wherein the electronic transaction is a financial trade, a financial portfolio status inquiry, a healthcare payment, or a confidential record.

10. The method of claim 1 wherein the biometric information encodes one of fingerprint information, iris scan information, facial recognition information, or voice recognition information associated with the user.

11. The method of claim 10 wherein the remote server stores encryption and decryption algorithms configured to mask and unmask the fingerprint information.

12. The method of claim 1 wherein the temporary URL lasts for between one second and fifteen minutes before expiring.

13. The method of claim 1 wherein the temporary URL includes a first portion including predetermined text and a second portion including text including encrypted request information.

14. The method of claim 1 wherein the temporary URL is generated randomly by the remote server.

15. The method of claim 1 wherein the biometric information is captured by hardware included in the computing device.

16. The method of claim 1 wherein the remote server includes a biometric reference of the user, the biometric reference enabling determination of the verification result of the biometric information.

17. A system for authenticating an electronic transaction, the system comprising:
 a remote server configured to verify biometric information and generate a verification result for the biometric information;
 a communications network in communication with the remote server; and
 a computing device in communication with the communications network, the computing device configured to:
  initiate, using an untrusted third party application installed on the computing device, a request to complete the electronic transaction, the request including one or more request details provided by a user of the computing device to an untrusted third party application server operating independently of the computing device;
  receive, by the third party application, from the remote server via the untrusted third party application server over the communications network, a temporary URL including an encrypted token reflecting the request details;
  decrypt, by a background application installed on the computing device, the encrypted token included in the temporary URL;
  display, upon accessing the temporary URL, the one or more request details and a prompt for the user of the computing device to provide biometric information to verify the request;
  receive, by a biometric hardware device in communication with the computing device, the biometric information;
  pass, by the biometric hardware device, the biometric information to a hardware abstraction layer of the computing device, the hardware abstraction layer mapping the biometric information to generate a key;
  encrypt, by the biometric hardware device, the key, thereby creating an encrypted key;
  send, by the background application installed on the computing device, the encrypted key to the remote server via the communications network; and
  receive, from the remote server via the communications network, the verification result for the request based on the encrypted key sent to the remote server.

18. The system of claim 17 wherein the remote server is configured to compare the information included in the encrypted key with a biometric reference stored on the remote server to generate the verification result for the biometric information.

19. The system of claim 17 wherein the background application is configured to activate a biometric sensor of the biometric hardware device and to encrypt the output of firmware for the biometric sensor.

20. The system of claim 17 wherein the remote server stores an encryption algorithm configured to mask the biometric information and a decryption algorithm configured to unmask the biometric information.

21. The system of claim 17 wherein the electronic transaction is a financial trade or a financial portfolio status inquiry.

22. A computerized method of authenticating an electronic transaction using a remote server, the method comprising:
 receiving, by a server application installed on the remote server, a request to complete an electronic transaction via an untrusted third party account hosted on an untrusted third party application server operating independently of the computing device, the request including one or more request details;
 identifying, by the server application installed on the remove server, a user account corresponding to the third party account;
 requesting, by the server application installed on the remote server, to generate a temporary URL including an encrypted token based on information associated with the request;
 sending, by the server application installed on the remote server, the temporary URL to a computing device via a communications network in communication with the remote server;

receiving, by the server application installed on the remote server, an encrypted key reflecting biometric information of the user and generated by the computing device;

decrypting, by the server application installed on the remote server, the encrypted key, thereby recovering unencrypted biometric information;

checking, by the server application installed on the remote server, against a biometric reference stored on the remote server, whether the unencrypted biometric information is sufficient to validate the request; and (i) if the server application validates the request, processing the request and sending a positive verification result, by the remote server, via the communications network, to the computing device; or (ii) if the server application does not validate the request, sending a negative verification result, by the remote server, via the communications network, to the computing device.

* * * * *